(12) United States Patent
Iwamoto et al.

(10) Patent No.: US 6,616,738 B2
(45) Date of Patent: Sep. 9, 2003

(54) HYDROGEN STORAGE AND RELEASE APPARATUS

(75) Inventors: Takashi Iwamoto, Hokkaido (JP); Masamitsu Murai, Hokkaido (JP); Yutaka Shimizu, Hokkaido (JP); Kazuo Noie, Hokkaido (JP)

(73) Assignee: The Japan Steel Works, Ltd., Tokyo (JP)

( * ) Notice: Subject to any disclaimer, the term of this patent is extended or adjusted under 35 U.S.C. 154(b) by 0 days.

(21) Appl. No.: 09/875,880

(22) Filed: Jun. 8, 2001

(65) Prior Publication Data

US 2002/0020299 A1 Feb. 21, 2002

(30) Foreign Application Priority Data

Jun. 9, 2000 (JP) ..................................... P.2000-174483

(51) Int. Cl.⁷ ................................................. F17C 3/00
(52) U.S. Cl. ............................ 96/146; 96/126; 206/0.7; 165/138; 165/179
(58) Field of Search .......................... 96/108, 146, 126, 96/133; 206/0.7; 423/248, 648.1; 420/900; 165/58, 138, 177, 179

(56) References Cited

U.S. PATENT DOCUMENTS

| 4,165,569 A | * | 8/1979 | Mackay ........................ 34/416 |
| 4,225,320 A | * | 9/1980 | Gell ............................ 206/0.7 |
| 4,393,924 A | * | 7/1983 | Asami et al. ........... 165/104.12 |
| 4,446,111 A | * | 5/1984 | Halene et al. ................ 206/0.7 |
| 4,548,044 A | * | 10/1985 | Sakai et al. ........... 123/DIG. 12 |
| 4,819,718 A | * | 4/1989 | Ishikawa et al. ....... 165/104.12 |
| 4,928,496 A | * | 5/1990 | Wallace et al. ........ 165/104.12 |
| 6,161,768 A | * | 12/2000 | Gordon et al. ............. 237/12.1 |
| 6,432,379 B1 | * | 8/2002 | Heung ..................... 423/648.1 |

FOREIGN PATENT DOCUMENTS

JP 2001183078 A * 7/2001

* cited by examiner

Primary Examiner—Duane Smith
Assistant Examiner—Frank M. Lawrence
(74) Attorney, Agent, or Firm—Sughrue Mion, PLLC

(57) ABSTRACT

A hydrogen storage and release apparatus is provided with a heat exchanging portion provided with hydrogen storage alloy containers, a heat exchanger body in which the heat exchanging portion is received so that a heat gas or coolant is introduced and discharged, and a hydrogen-travelling passage connected to the containers so that hydrogen can move to the containers. The heat exchanging portion is provided so that the heat exchanging efficiency on the heat gas discharge side of the heat exchanging portion is made higher than that on the heat gas introduction side thereof.

6 Claims, 7 Drawing Sheets

HYDROGEN STRORAGE ALLOY

HYDROGEN STORAGE AND RELEASE APPARATUS

CROSS REFERENCE TO RELATED APPLICATIONS

The present invention is based on Japanese Patent Application No. 2000-174483, which is incorporated herein by reference.

BACKGROUND OF THE INVENTION

1. Field of the Invention

The present invention relates to a hydrogen storage and release apparatus using relatively low temperature heat gas generated from a micro gas turbine or the like in which storage and release of hydrogen can be performed efficiently.

2. Description of the Related Art

Recently, attention has been paid to a micro gas turbine electric power plant as a distributed electric source capable of generating electric power efficiently and capable of reducing the system size. The plant uses natural gas or biogas as fuel and the fuel is burned to operate a small-sized gas turbine to thereby generate electric power. However, the energy efficiency in the plant is not sufficiently high. A large amount of energy is lost as waste heat into exhaust gas. Therefore, a method for efficient use of the waste heat has been researched and a system of obtaining hot water from such waste heat has been proposed. However, the range of use of hot water or the like is limited and the whole amount of the hot water cannot be always used. Therefore efficient use of the waste heat is not sufficient and energy efficiency carried out by the whole plant has not been yet improved sufficiently.

Although the field of the application is different from the field of micro gas turbine, the Applicant of the present application has developed systems in which high-temperature waste heat or the like generated from a factory or the like is used as a driving source, and hydrogen storage alloys in combination with coolants are used for storing or releasing hydrogen to thereby make it possible to perform storage of hydrogen, purification of hydrogen, air-conditioning, refrigeration, heat migration, etc. When, for example, this system is applied to an air-conditioner, a high-temperature-side hydrogen storage alloy and a low-temperature-side hydrogen storage alloy are provided so that hydrogen can move between the two alloys. Further, high-temperature and high-pressure steam is obtained from waste heat and used as a heat medium to heat the high-temperature-side hydrogen storage alloy. The hydrogen storage alloy releases stored hydrogen when it is heated and then the released hydrogen is stored into the low-temperature-side hydrogen storage alloy. After that, when the high-temperature-side hydrogen storage alloy is cooled so as to generate hydrogen suction force, hydrogen is released from the low-temperature-side hydrogen storage alloy and stored into the high-temperature-side hydrogen storage alloy. On this occasion, cold heat is generated in the low-temperature-side hydrogen storage alloy. Hence, the cold heat is used as a heat source for air-conditioning. In this method, improvement in energy-utilizing efficiency can be attained because an air-conditioning output can be obtained by use of waste heat. Hence, if such air-conditioning or the like can be performed by the aforementioned system by use of waste heat discharged from the aforementioned micro gas turbine, total energy efficiency is improved greatly.

However, since this system uses exhaust gas discharged from a micro gas turbine in which the exhaust gas temperature is low, high-temperature and high-pressure steam cannot be obtained from the exhaust gas when the gas temperature is not sufficiently high. When the temperature of the steam is low, the hydrogen storage alloy cannot be heated sufficiently. As a result, hydrogen cannot be released securely. Hence, such the system cannot be operated well.

SUMMARY OF THE INVENTION

The present invention is made by taking the aforementioned circumstances into consideration and has an object to provide a hydrogen storage and release apparatus in which thermal energy is obtained efficiently from a relatively low temperature heat gas so that the thermal energy can be used as a driving source to make hydrogen stored and released by means of a hydrogen storage alloy.

That is, in order to solve the above problem, according to a first aspect of the present invention, there is provided a hydrogen storage and release apparatus comprising: a heat exchanging portion including hydrogen storage alloy containers each containing a hydrogen storage alloy for storing and releasing hydrogen; a heat exchanger body in which the heat exchanging portion is received, and into which a heat gas or coolant is introduced to perform heat exchange with the heat exchanging portion, and from which the heat gas or coolant is discharged after heat exchange; and a hydrogen-travelling passage connected to the hydrogen storage alloy containers so that hydrogen can move to the hydrogen storage alloy containers, the heat exchanging portion being set in such a manner that the heat exchanging efficiency on the heat gas discharge side of the heat exchanging portion is made higher continuously or stepwise than that on the heat gas introduction side of the heat exchanging portion.

According to a second aspect of the present invention, in the hydrogen storage and release apparatus as defined in the first aspect, preferably, the heat exchanging efficiency of the heat exchanging portion is adjusted by fins provided on a part or on the whole of an outer surface of the hydrogen storage alloy containers.

According to a third aspect of the present invention, in the hydrogen storage and release apparatus as defined in the first or second aspect, preferably, the hydrogen storage alloy containers are constituted by numbers of pipe bodies each containing a hydrogen storage alloy in its inside so as to be aerated, the numbers of pipe bodies being arranged in parallel so that gaps are formed among the pipe bodies, the heat exchanging portion being configured so that the heat gas passes through the gaps along a direction crossing a longitudinal direction of the pipe bodies.

According to a forth aspect of the present invention, in the hydrogen storage and release apparatus as defined in any one of the first through third aspects, preferably, the heat gas is a exhaust gas generated by combustion of fuel in a micro gas turbine.

According to the present invention, heat gas is used as a driving source. Exhaust gas of a micro gas turbine is a typical example of a source generating such heat gas. However, the source generating such heat gas according to the present invention is not limited thereto. The present invention may be applied to various kinds of generating sources. The present invention is originally based on the assumption that it is difficult to obtain high-temperature and high-pressure steam from the heat gas and the heat gas the temperature of which is relatively low is used. The temperature of the heat gas is not limited specifically to the relatively low one and higher-temperature heat gas may be also used. That is, the present invention provides a hydrogen storage and release apparatus which can be driven even by relatively low temperature heat gas, but the condition that the temperature of the heat gas is low is not the requirement of the present invention.

In the present invention, a hydrogen storage alloy is required for storing and releasing hydrogen. The hydrogen storage alloy is not limited to a specific kind of alloy and any suitable alloy maybe selected as the hydrogen storage alloy. Incidentally, in a system in which the hydrogen storage and release apparatus according to the present invention is disposed on the high temperature side and used in pair with a hydrogen storage and release apparatus disposed on the low temperature side, it is preferable to consider the heating temperature on the high temperature side and the temperature to be used on the low temperature side when hydrogen storage alloys are selected on the high and low temperature sides respectively.

These hydrogen storage alloys are contained in alloy containers in a condition that hydrogen can be stored and released. The storage and release of hydrogen can be achieved when an aeration material is disposed in each container or an aeration passage is secured to make it possible to move hydrogen. Each of the alloy containers is made of a material having a shape adapted for heat exchange or good in heat conduction because the alloy container serves as a heat exchanging portion. Consideration is made so that the contact between the alloy containers and the heat gas or the cooling heat medium (hereinafter referred to as "coolant") can be made effectively. Particularly, the contact and heat exchange between the alloy containers and the heat gas are important to the present invention.

As an example of the configuration in which such contact and heat exchange are performed well, there is provided a system in which: each of the hydrogen storage alloy containers is shaped like a pipe body containing a hydrogen storage alloy; the hydrogen storage alloy containers are arranged side by side vertically and horizontally as a large number of containers so that gaps are formed among the pipe bodies; and the heat gas passes through the gaps in a direction crossing the longitudinal direction of the pipe bodies. According to the aforementioned configuration, heat gas smoothly passes through the gaps among the pipe bodies. Hence, applying load to a generating source of the heat gas such as a micro gas turbine can be avoided. Moreover, the heat gas can be subjected to heat exchange with the pipe bodies efficiently because the heat gas flows along the outer walls of the pipe bodies. On this occasion, the heat gas flows in a direction crossing the longitudinal direction of the pipe bodies. Hence, variation in heat exchange efficiency can be reduced in the longitudinal direction of the pipe bodies, so that the hydrogen storage alloy contained in the pipe bodies can be heated evenly. Incidentally, the number of the pipe bodies to be arranged side by side vertically and horizontally, the size of the gaps, etc., may be determined suitably.

In the present invention, the heat exchanging portion is configured in such a manner that the heat exchanging efficiency on the heat gas discharge side becomes continuously or stepwise higher than that on the heat gas introduction side. Incidentally, the heat exchanging efficiency is determined on the basis of the magnitude of the quantity of heat transmitted to the hydrogen storage alloy containers by heat gas when amount and temperature of the heat gas are constant. It is to be assumed that the larger the quantity of heat is transmitted, the higher the heat exchanging efficiency is.

The setting of the heat exchanging efficiency can be performed by fins provided partly or on the whole of the outer surface of the hydrogen storage alloy containers. Specifically, fins may be provided selectively on hydrogen storage alloy containers located on the gas discharge side, or the surface area of fins, the number of the arranged fins and the density of arrangement of the fins may be changed in accordance with the position between the heat gas introduction side and the heat gas discharge side to thereby achieve the aforementioned configuration (when the efficiency is to be made high, the surface area of fins on the discharge side is increased, the number of fins disposed on the discharge side is increased or the density of arrangement of fins on the discharge side is increased.)

When the heat exchanging portion is constituted by a plurality of alloy containers each shaped like a pipe body as described above, the density of arrangement of such pipe bodies on the discharge side may be increased, the diameter of the pipe bodies on the discharge side may be increased or alloy containers of a good heat-conductive material different from alloy containers on the introduction side may be disposed on the discharge side so that the heat exchanging efficiency can be adjusted.

It is preferable that the adjustment of the heat exchanging efficiency is performed also upon the movement of the coolant in the same manner as described above. However, because cooling is performed rapidly, there is no large problem in uniformity in comparison with the case for heating. Also in the present invention, the aforementioned setting may be performed only upon the movement of heat gas.

The heat exchanging portion is located in the heat exchanger body into which a heat gas or coolant is introduced and from which the heat gas or coolant is discharged after heat exchange, so that heat exchange is performed between the heat exchanging portion and the heat gas or coolant. Any material may be used as the heat exchanger body so long as a gas flow path can be secured and heat exchange can be made between the heat exchanging portion and the heat gas or coolant. The methods for introducing the heat gas or coolant into the heat exchanger body and for discharging therefrom are not particularly limited. Further, any suitable inlet portion and any suitable outlet portion may be provided to perform the introduction and discharge of the heat gas or coolant. The introducing and discharging of the heat gas or coolant may be performed by a common inlet and outlet portion. Alternatively, the introducing and discharging may be performed by an inlet portion and an outlet portion prepared separately.

Incidentally, the coolant is provided for cooling the hydrogen storage alloy containers and the hydrogen storage alloy heated by the heat gas. The coolant is not limited in kind so long as the provision purpose can be achieved. Generally, air or water is used as the coolant.

A hydrogen-travelling passage is connected to the alloy containers so as to make hydrogen move to the alloy containers. Although the hydrogen-travelling passage can be constituted by a pipe passage or the like, the configuration of the hydrogen-travelling passage according to the present invention is not specifically limited. In short, any material may be used so long as the material can move hydrogen in accordance with storage of hydrogen into alloy containers or release therefrom.

The hydrogen moved through the hydrogen-travelling passage is used in a system using the hydrogen storage and release apparatus according to the present invention. The method of use thereof varies in accordance with the content of the system but is not limited to a specific method of use.

For example, hydrogen may be burned as fuel or reserved as purified hydrogen or stored and released by means of another hydrogen storage alloy so as to obtain an air-conditioning, refrigeration output or heat migration.

That is, in the hydrogen storage and release apparatus according to the present invention, heat gas introduced into the heat exchanger body is subjected to heat exchange with the heat exchanging portion on the side relatively low in heat exchanging efficiency, so that the heat of the gas is transmitted to the alloy containers. On the gas introduction side, the heat exchanging efficiency of the heat gas becomes relatively low but the quantity of heat contained by the gas is sufficiently high. Hence, the heat exchange can be performed well and the reduction in the quantity of heat can be suppressed. Hence, the heat gas moves to the discharge side while the quantity of heat carried by the heat gas is kept relatively high. On the other hand, on the discharge side, the heat exchanging efficiency is relatively high, so that heat of the gas is effectively transmitted to the heat exchanging portion, that is, the alloy containers and the hydrogen storage alloy. As a result, the hydrogen storage alloy as a whole is heated evenly regardless of the position of the alloy in the heat exchanger body, so that hydrogen is released evenly from the hydrogen storage alloy.

On the other hand, when the aforementioned setting of the heat exchanging efficiency is not made, heat gas introduced into the heat exchanger body is subjected to heat exchange effectively on the introduction side heat exchanging portion, therefore, a large part of the quantity of heat is lost. In the discharge side heat exchanging portion, the quantity of heat to be transmitted from the gas to the heat exchanging portion is reduced relatively greatly, thus, the heating effect is reduced. As a result, the heating state of the heat exchanging portion, that is, the alloy containers and the hydrogen storage alloy, is made uneven in accordance with the position of the alloy containers and the hydrogen storage alloy in the heat exchanger body. Therefore, release of hydrogen from the discharge side hydrogen storage alloy is delayed greatly. Since a storage and release apparatus performs its function on the basis of release of hydrogen from the hydrogen storage alloys in the apparatus as a whole, a longer time is taken until the discharge side alloy containers which are not effectively heated are to be sufficiently heated. Meanwhile, in this period, the gas introduction-side hydrogen storage alloy is sufficiently heated and continued to be heated even after release of hydrogen from the alloy is achieved. Hence, in the hydrogen storage and release apparatus, hydrogen releasing efficiency depends on the heat exchange state on the discharge side, and total efficiency is lowered. In the present invention, however, uniformity of heat exchange in the heat exchanging portion is attained so that total efficiency is improved.

DETAILED DESCRIPTION OF THE PREFERRED EMBODIMENTS

An embodiment of the present invention will be described below with reference to the accompanying drawings.

Figure 5:
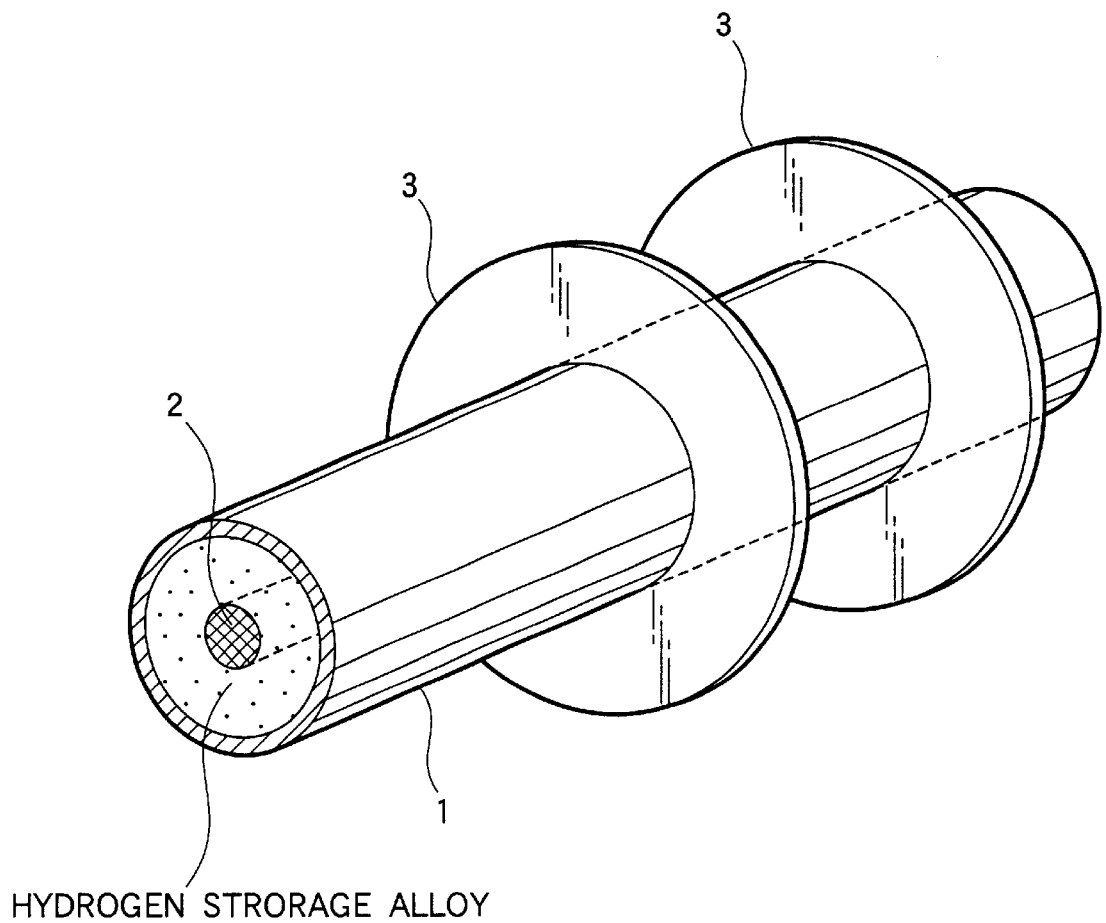
FIG. 5 is an enlarged sectional perspective view of an alloy container in the hydrogen storage and release apparatus according to the present invention.

As shown in FIG. 5, each hydrogen storage alloy container 1 is shaped like a cylinder containing an aeration material 2 disposed in its axial center portion, and hydrogen storage alloy power received in its inner space. A large number of such hydrogen storage alloy containers 1 are prepared as a heat exchanging portion. Flange-like fins 3 are provided on the outer surface of part of the hydrogen-stored ally containers 1 so as to be disposed at predetermined intervals.

Figure 1:
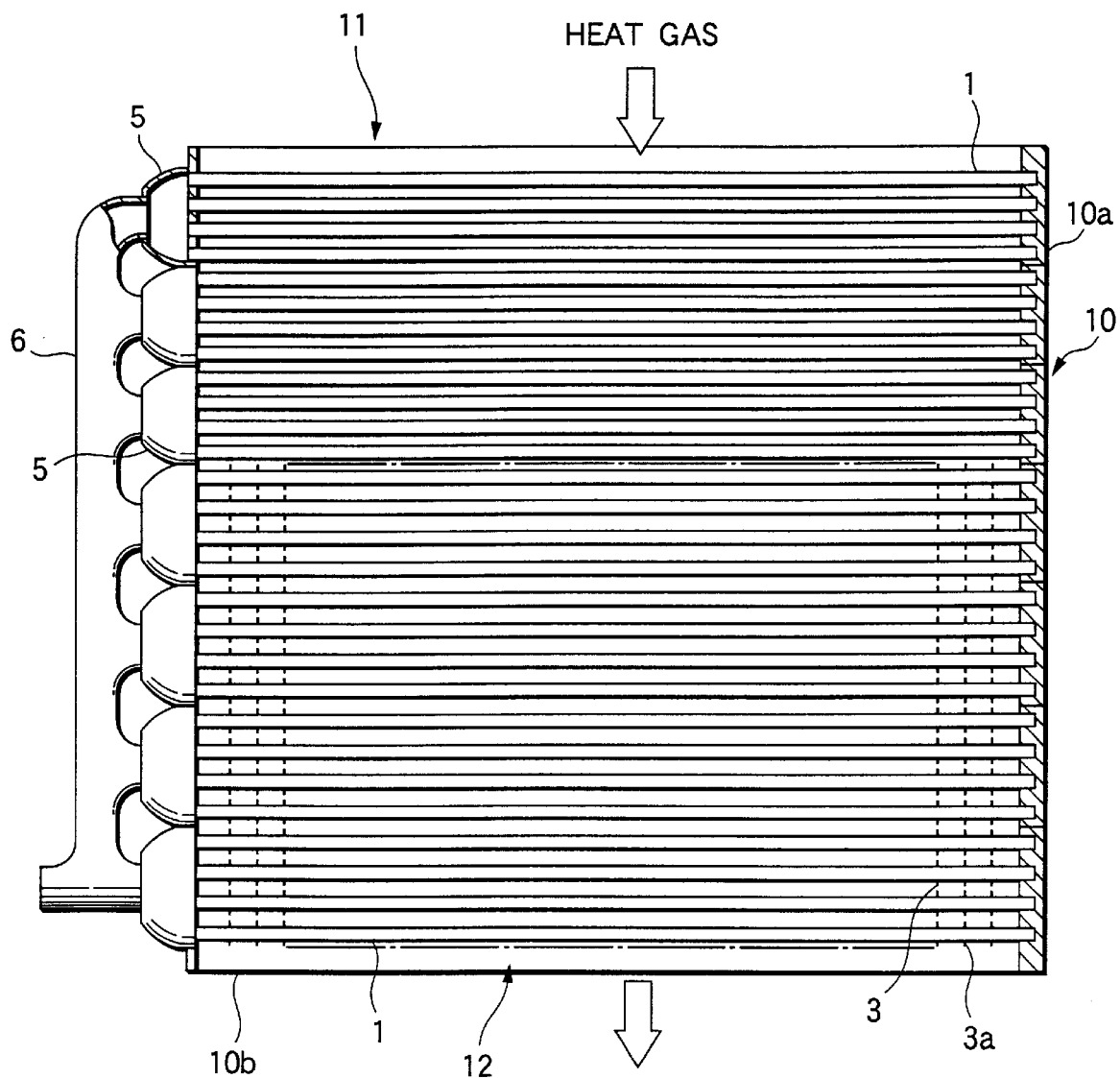
FIG. 1 is a partly sectional front view showing a hydrogen a storage and release apparatus according to the present invention.
Figure 2:
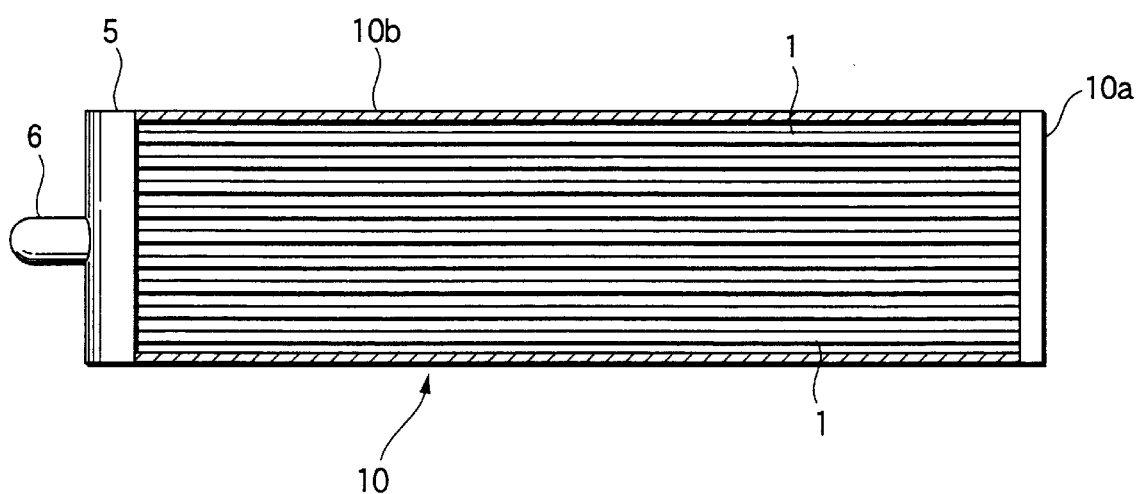
FIG. 2 is a partly sectional plan view showing the hydrogen storage and release apparatus according to the present invention.
Figure 3:
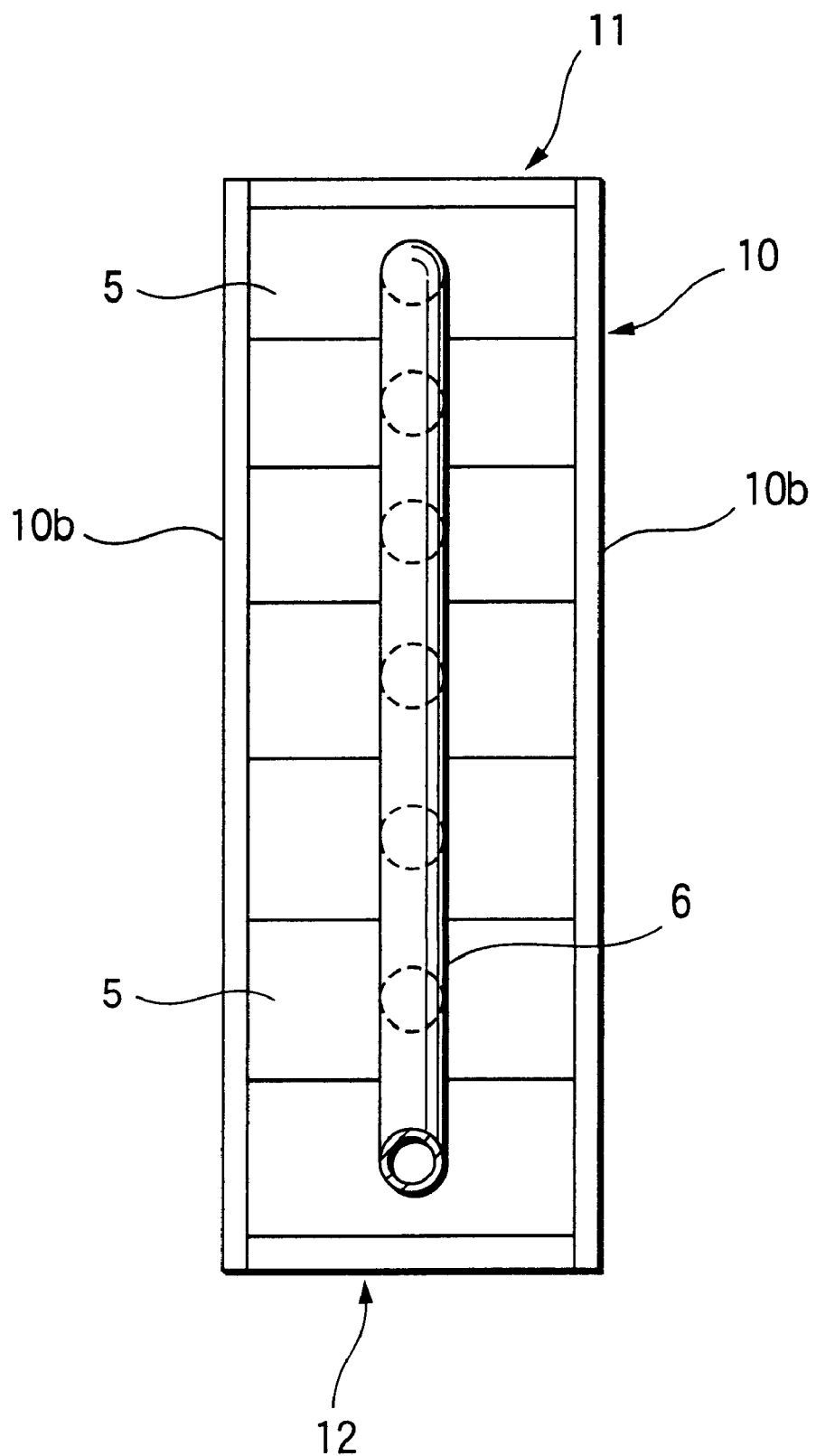
FIG. 3 is a side view showing the hydrogen storage and release apparatus according to the present invention.

As shown in FIGS. 1 through 3, the large number of containers 1 are arranged side by side vertically and horizontally and have one-end sides connected to hollow base portions 5 every plurality of containers. The other-end sides of the containers 1 are sealed and fixed to a vertical wall portion 10a of a heat exchanger body 10. A pair of side wall portions 10b are disposed on opposite end sides between the base portions 5 and the vertical wall portion 10a. The circumference of the containers 1 is surrounded so as to be plugged by the heat exchanger body 10 constituted by combination of the base portions 5, the vertical wall portion 10a and the pair of side wall portions 10b. An upper opening portion (shown in FIG. 1) at an upper end surrounded by those wall portions is assigned to a heat gas and coolant inlet portion 11 whereas a lower opening portion (shown in FIG. 1) at a lower end is assigned to a heat gas and coolant outlet portion 12.

The base portions 5 are connected to a hydrogen-travelling pipe 6. One end of the hydrogen-travelling pipe 6 extends to the outside. These base portions 5 and the hydrogen-travelling pipe 6 constitute a hydrogen-travelling passage.

Figure 4:
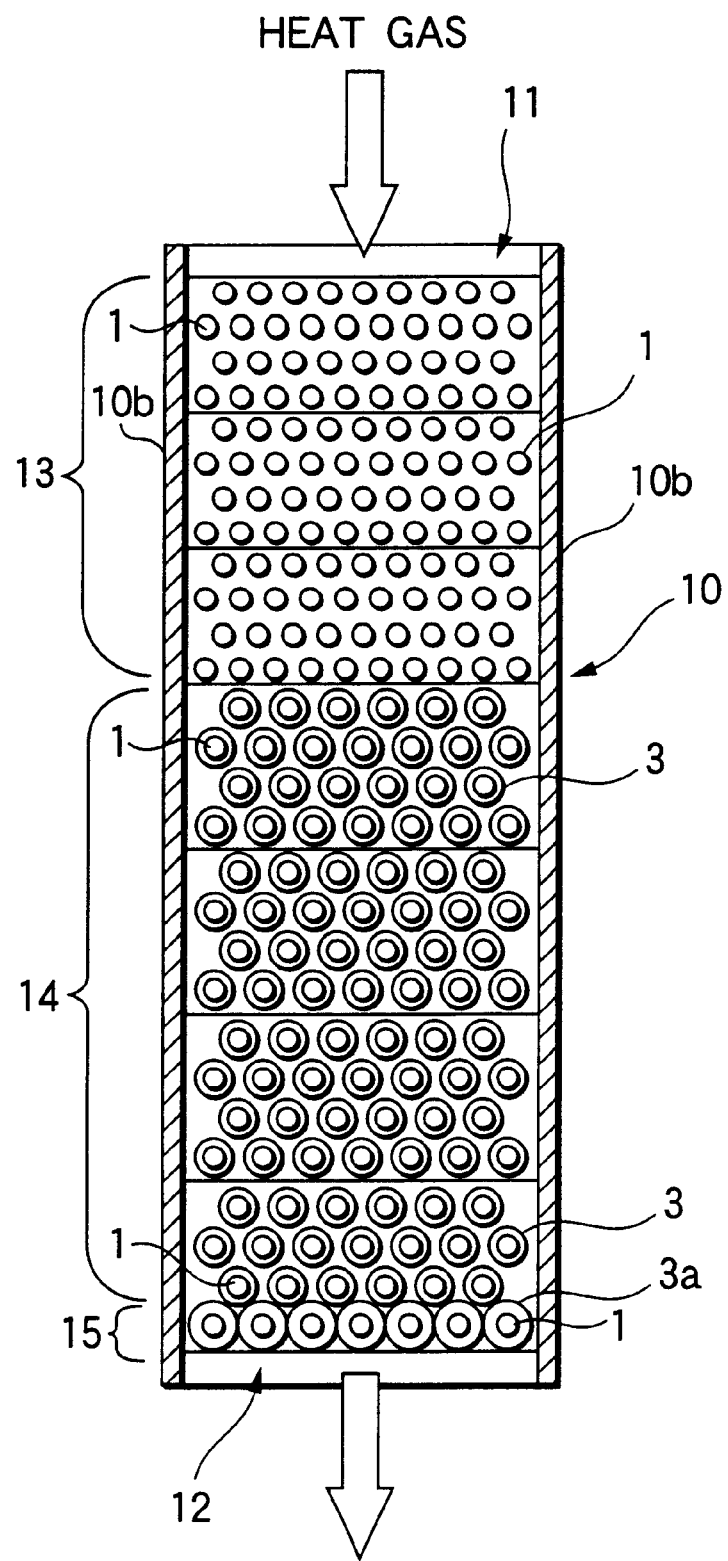
FIG. 4 is a partly sectional right side view showing the hydrogen storage and release apparatus according to the present invention.

As shown in FIG. 4, the heat exchanger body 10 of this embodiment includes three sections as its heat exchange portion along with the heat gas and coolant flow direction, that is, an introducing section 13 which is allocated on a side near the heat gas and coolant inlet portion 11, an intermediate section 14 which is allocated on the adjacent of the introducing section 13, and a discharging section 15 which is constituted by a row nearest to the heat gas and coolant outlet portion 12.

In the introducing section 13, there is no fin provided on the outer surface of the containers 1. Hence the heat exchange efficiency of this portion is not sufficiently high. In the intermediate section 14, the fins 3 are provided on the outer surface of the containers 1 at axially predetermined intervals, so that the heat exchanging efficiency of the intermediate section 14 is set higher than that of the introducing section 13. Further, fins 3a with a large diameter for improving the heat exchanging efficiency are provided on the outer surface of the containers 1 in the discharging section 15, so that the highest heat exchange efficiency is obtained among the three sections of the heat exchange portion.

As described above, the heat exchanging efficiency becomes higher along with the heat gas and coolant flow directions in stepwise manner in this embodiment.

Although the above description has been made upon the case where the hydrogen storage and release apparatus has a heat gas inlet portion at its upper and a heat gas outlet portion at its lower, the direction of arrangement of the heat gas introducing and outlet portions can be selected at option in use.

An embodiment of the present invention where the aforementioned storage and release apparatus are applied to a refrigeration system will be described below.

Figure 6:
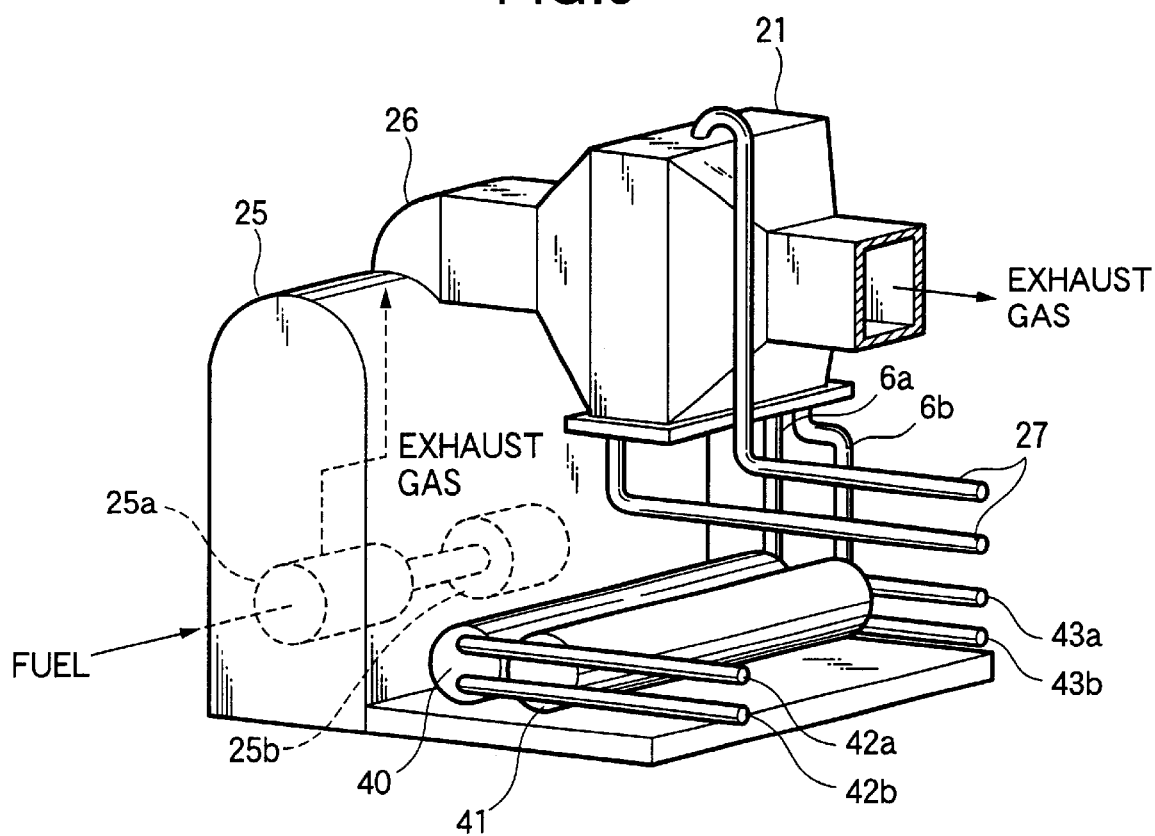
FIG. 6 is a perspective view of a refrigeration system using the hydrogen storage and release apparatus according to the present invention.

The refrigerator of this embodiment, as shown in FIG. 6, has a duct 21 connected to an exhaust duct 26 of a gas turbine electric power plant 25. The gas turbine plant 25 has a gas turbine 25a and an electric generator 25b in its inside. Exhaust gas generated in the gas turbine 25a is delivered to the exhaust duct 26.

Two hydrogen storage and release apparatuses 20a and 20b as described above are provided in parallel within the refrigeration system, and inlet and outlet portions of the two apparatuses 20a and 20b are put in the common duct 21.

Figure 7:
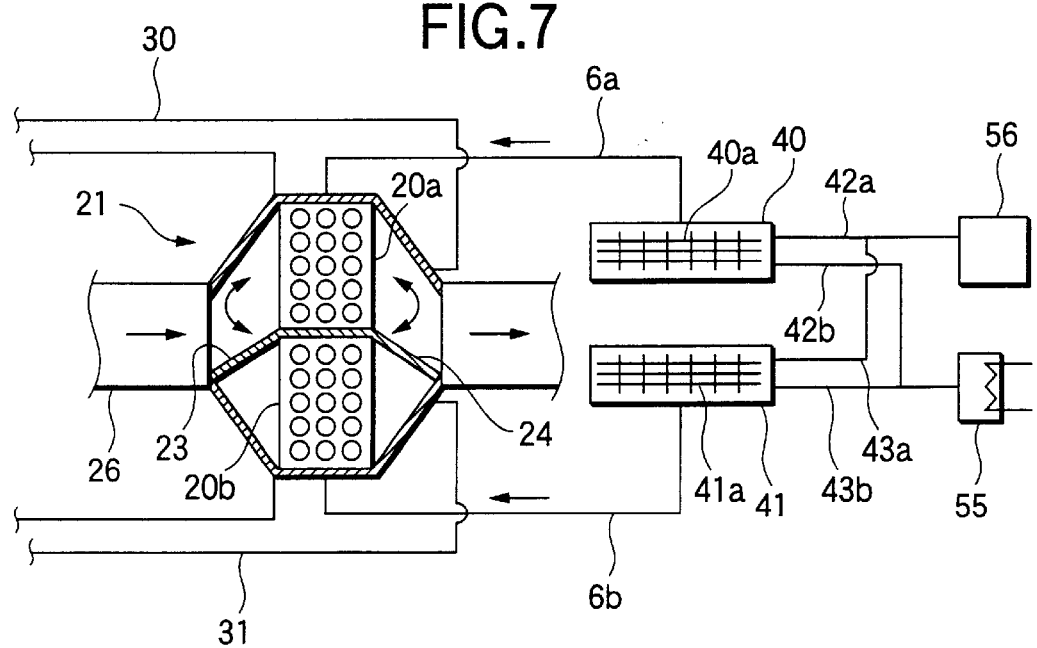
FIG. 7 is a schematic view showing the refrigeration system according to the present invention.
Figure 8:
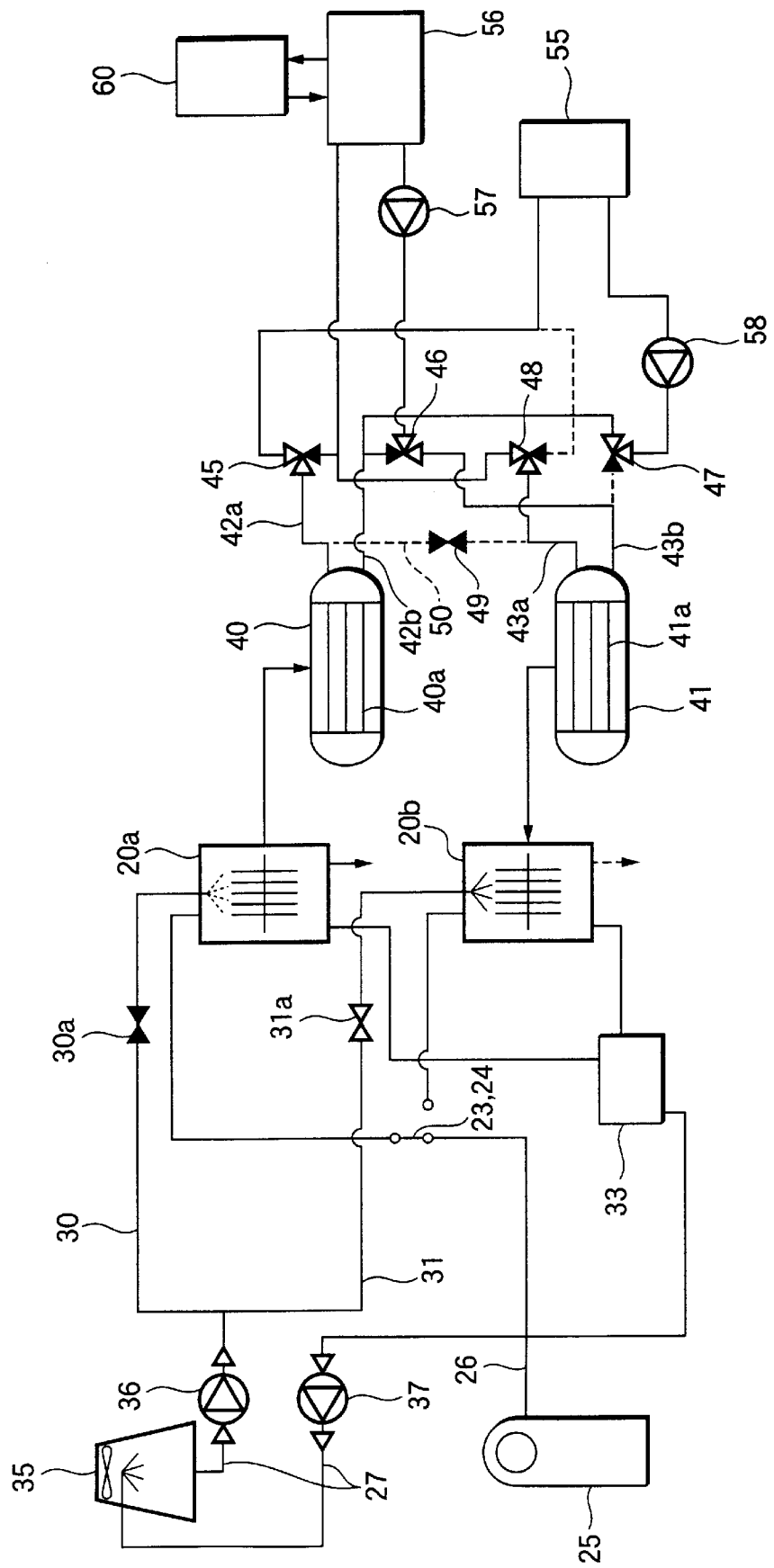
FIG. 8 is an overall schematic view of according to the present invention.

In the duct 21, as shown in FIG. 7, a rotation damper 23 is disposed on the gas introduction side of the duct 21 and a rotation damper 24 is disposed on the gas discharge side of the duct 21. The duct is configured so that gas flows selectively on only one of the hydrogen storage and release apparatuses 20a and 20b.

Cooling water pipes 27 are connected to the duct 21 so that cooling water is selectively supplied to only one of the hydrogen storage and release apparatuses 20a and 20b. The cooling water pipes 27 are connected to the hydrogen storage and release apparatuses 20a and 20b respectively through inner pipes 30 and 31 connected to the hydrogen storage and release apparatuses and through valves 30a and 31a and a cooling water recovery tank 33 within the duct 21. The cooling water pipes 27 are further connected to an external cooling tower 35 through cooling water pumps 36 and 37 respectively.

Two low-temperature-side heat exchangers 40 and 41 are disposed near the electric power plant 1. Alloy containers 40a and 41a each containing a hydrogen storage alloy are disposed in the heat exchangers 40 and 41 respectively. A hydrogen-travelling pipe 6a on the hydrogen storage and release apparatus 20a side is connected to the alloy container 40a. A hydrogen-travelling pipe 6b on the hydrogen storage and release apparatus 20b side is connected to the alloy container 41a.

Two pairs of heat medium pipes 42a and 42b; 43a and 43b for introducing or discharging a cold-heat or cooling heat medium are connected to the heat exchangers 40 and 41 respectively so that the heat medium is brought into contact with the alloy containers 40a and 41a.

These heat medium pipes 42a and 42b; 43a and 43b extend outward so as to be connected to an illustrated valve control circuit. In the valve control circuit, one port of a three-way valve 45 is connected to the heat medium pipe 42a, another port of the three-way valve 45 is connected to the return flow side of a heat exchanger 55 with respect to cooling water and the other port of the three-way valve 45 is connected to the return flow side of a cold-heat heat medium tank 56. The heat medium pipe 42b is connected to one port of a three-way valve 46 and to one port of a three-way valve 47. Another port of the three-way valve 46 is connected to the delivery flow side of the cold-heat heat medium tank 56 through a heat medium pump 57. The heat medium pipe 43b is connected to the other port of the three-way valve 46. The heat medium pipe 43b is further connected to another port of the three-way valve 47. The return flow side of the heat exchanger 55 with respect to cooling water is connected to the other port of the three-way valve 47 through a cooling liquid pump 58. The heat medium pipe 43a is connected to one port of a three-way valve 48. The return flow side of the heat exchanger 55 with respect to cooling water is connected to another port of the three-way valve 48. The other port of the three-way valve 48 is connected to the return flow side of the cold-heat heat medium tank 56. The heat medium pipes 42a and 43a are connected to each other through a sensible heat recovery pipe 50 and through a valve 49.

The specific operation of the refrigeration system will be described below.

In the micro gas turbine electric power plant 25, fuel such as natural gas is introduced and burned to operate the gas turbine 25a. Thus, the output of the gas turbine 25a drives the electric generator 25b to generate electric power. The electric power is supplied to suitable electric appliances, equipment, etc.

In the gas turbine 25b, exhaust gas with waste heat at about 300° C. is generated by the burning of the fuel. The exhaust gas is delivered to the outside of the micro gas turbine electric plant 25 through the exhaust gas duct 26 and introduced into the duct 21. In this condition, the rotation dampers 23 and 24 are located so as to open the storage and release apparatus 20a-side passage and close the storage and release apparatus 20b-side passage. Further, in this occasion, it is now to be assumed that hydrogen has been already stored in the storage and release apparatus 20a and the hydrogen storage alloy contained in each of the alloy containers 41a disposed in the heat exchanger 41 whereas hydrogen has been already released from the storage and release apparatus 20b and the hydrogen storage alloy contained in each of the alloy containers 40a disposed in the heat exchanger 40.

The exhaust gas travelling in the exhaust gas duct 26 is introduced into the storage and release apparatus 20a side by means of the rotation dampers 23 and 24. The exhaust gas then passes through gaps among the group of alloy containers 1 and is discharged from the discharge side. Incidentally, the exhaust gas may be abolished directly or may be recycled as a heat source or the like to obtain hot water.

In the group of alloy containers 1, waste heat in the exhaust gas is directly transmitted to the walls of the alloy containers by the passage of the exhaust gas to thereby heat the hydrogen storage alloy contained in the alloy containers. Incidentally, in this occasion, heat is transmitted on the exhaust gas introduction side in accordance with the area of the wall surface in each bare alloy container because the bare alloy containers are disposed on the exhaust gas introduction side. On the other hand, the area of contact between the exhaust gas and each of the alloy containers increases greatly to improve heat exchanging efficiency on the discharge side because each of the discharge side alloy containers is provided with a large number of fins 3 or 3a. Hence, waste heat is more efficiently transmitted to the hydrogen storage alloy on the discharge side in which the temperature is going to become low, so that the hydrogen storage alloy can be heated evenly over the whole of the group of containers 1. Stored hydrogen is released from the heated hydrogen storage alloy. The hydrogen passes through the aeration material 2 and reaches the base portions 5. The hydrogen is moved to the low-temperature-side heat exchanger 40 through the hydrogen-travelling pipe 6a by equilibrium pressure. Hence, in the low-temperature-side heat exchanger 40, the hydrogen is stored by the hydrogen storage alloy contained in the alloy containers 40a. Incidentally, in this occasion, the heat medium pipes 42a and 42b are connected to the heat exchanger 55 with respect to cooling water by the operation of the three-way valves 45 to 48 to introduce cooling liquid into the heat exchanger 40 to cool the hydrogen storage alloy contained in the alloy containers 40a to thereby promote storage of hydrogen. This step is equivalent to the step of reclaiming the low-temperature-side hydrogen storage alloy and also equivalent to the step of preparation for generating cold heat in a post-step.

On the other hand, the storage and release apparatus 20b side is in a state in which hydrogen has been already released from the hydrogen storage alloy in the aforementioned step as a pre-step, that is, in a state in which hydrogen has been already stored in the hydrogen storage alloy contained in the alloy containers 41a of the heat exchanger 41.

The storage and release apparatus 20b is in a state in which the group of alloy containers 1 have been heated by exhaust gas in the same manner as described above, that is, in a state in which the group of alloy containers 1 and the hydrogen storage alloy contained in the group of alloy containers 1 are at a high temperature. In this state, in parallel with the aforementioned step, the valve 31a is opened (the valve 30a is in a closed state) to connect the cooling water pipe 27 to the storage and release apparatus 20b-side inner pipe 31 to send cooling water from the cooling tower 35 by the pump 36 to apply the cooling water onto the group of alloy containers 1 to thereby cool the group of alloy containers 1 and the hydrogen storage alloy contained in the group of alloy containers 1. The cooling water applied onto the group of alloy containers 1 is recovered to the cooling water recovery tank 33 and returned to the cooling tower 35 through the cooling water pipe 27 by the pump 36.

Hydrogen equilibrium pressure of the hydrogen storage alloy contained in the group of alloy containers 1 is reduced by the aforementioned cooling, so that suction force of hydrogen is generated. The suction force is transmitted to the alloy containers 41a through the hydrogen-travelling pipe 6b. Hence, hydrogen is released from the hydrogen storage alloy contained in the alloy containers 41a by the suction force. The hydrogen is stored by the hydrogen storage alloy contained in the storage and release apparatus 20b through the hydrogen-travelling pipe 6b. In the alloy containers 41a, cold heat is generated by the release of hydrogen. In the heat exchanger 41, the heat medium pipes 43a and 43b are connected to the cold-heat heat medium tank 56 by the operation of the three-way valves 40 to 43 to thereby transmit the cold heat to the cold-heat heat medium circulating through the heat medium pipes 43a and 43b. Because the heat medium flows back to the heat medium tank 56, the heat medium is supplied to a refrigeration output portion 60 such as a refrigerator to generate a refrigeration output.

When the aforementioned operations are performed alternately in the combination of the storage and release apparatus 20a and the heat exchanger 40 and the combination of the storage and release apparatus 20b and the heat exchanger 41, the refrigeration output can be obtained continuously.

Incidentally, when the operations of the heat exchangers 40 and 41 are to be switched over, the valve 49 is opened to connect the heat exchangers 40 and 41 to each other through the sensible heat recovery pipe 50 to circulate the cold-heat heat medium between the heat exchangers 40 and 41 to thereby recover sensible heat from the alloy containers and the hydrogen storage alloy contained in the alloy containers.

As described above, in this refrigeration system, a refrigeration output can be generated efficiently even in the case where the temperature of heat gas is relatively low. When this refrigeration system is attached to a micro gas turbine electric power plant, an energy generating system very high in energy-utilizing efficiency can be obtained as a whole. Moreover, in the aspect of environment, the refrigeration output can be obtained without giving any damage on the environment. It can be said that this system is excellent in the environmental aspect when this system is combined with the micro gas turbine electric power plant gentle to the environment.

As described above, the hydrogen storage and release apparatus according to the present invention comprises: a heat exchanging portion including hydrogen storage alloy containers each containing a hydrogen storage alloy so as to store and release hydrogen; a heat exchanger body in which the heat exchanging portion is received, and into which a heat gas or coolant is introduced to perform heat exchange with the heat exchanging portion, and from which the heat gas or coolant is discharged after heat exchange; and a hydrogen-travelling passage connected to the hydrogen storage alloy containers so that hydrogen can move to the hydrogen storage alloy containers, the heat exchanging portion being set so that the heat exchanging efficiency on the heat gas discharge side of the heat exchanging portion is made higher continuously or stepwise than that on the heat gas introduction side of the heat exchanging portion. Hence, even in the case where the temperature of the heat gas is relatively low, heat can be recovered efficiently to perform storage and release of hydrogen and the efficiency of the apparatus is improved greatly.

When a gas generated by combustion of fuel in a micro gas turbine is used as the heat gas, not only can the aforementioned effect be obtained but also the energy-utilizing efficiency of a micro gas turbine electric power plant relatively low in energy-utilizing efficiency can be improved greatly.

Moreover, the size of the system can be reduced. Hence, this apparatus can be effectively applied to a high-efficient energy generating system in a small-scale enterprise such as a food processing factory or a convenience store requiring a refrigeration output in addition to electric power.

What is claimed is:

1. A hydrogen storage and release apparatus comprising:
    a heat exchanger main body through which heat gas and coolant passes for performing heat exchange;
    a heat exchanging portion provided in said exchanger main body, having a plurality of hydrogen storage alloy containers arranged substantially in parallel with each other, each hydrogen storage alloy container containing a hydrogen storage alloy therein for storing and releasing hydrogen; and
    a hydrogen-travelling passage connected to said hydrogen storage alloy containers and communicating to outside of said heat exchanger main body so that hydrogen can move;
    wherein, said plurality of hydrogen storage alloy containers are provided in said heat exchanging portion in such a manner that the heat exchanging efficiency on the heat gas discharge side of said heat exchanging portion is higher than that on the heat gas introduction side of said heat exchanging portion, wherein each hydrogen storage alloy container is constituted by a pipe containing a hydrogen storage alloy and an aeration material therein, said pipe bodies being arranged substantially in parallel so that gaps are formed among said pipe bodies, said heat exchanging portion being configured so that said heat gas passes through said gaps along a direction crossing a longitudinal direction of said pipe bodies, wherein diameters of the pipe bodies at the heat gas discharge side are equal to diameters of the pipe bodies at the heat gas introduction side, wherein the heat exchanging efficiency of said heat exchanging portion is made higher at the heat gas discharge side by providing fins on an outer surface of said hydrogen storage alloy containers contained in a discharge section of said exchanging portion.

2. A hydrogen storage and release apparatus according to claim 1, wherein the hydrogen storage alloy containers contained in an introduction section of said heat exchanging portion do not include fins.

3. A hydrogen storage and release apparatus according to claim 1, wherein said heat gas is an exhaust gas generated by combustion of fuel in a micro gas turbine.

4. A hydrogen storage and release apparatus according to claim 2, wherein the heat exchanging efficiency of said heat exchanging portion is made higher at the discharge portion than an intermediate portion by increasing surface areas of said fins provided on said outer surface of said hydrogen storage alloy containers.

5. A hydrogen storage and release apparatus according to claim 2, wherein the heat exchanging efficiency of said heat exchanging portion is adjusted by the number of said fins provided on said outer surface of said hydrogen storage alloy containers.

6. A hydrogen storage and release apparatus according to claim 2, wherein the heat exchanging efficiency of said heat exchanging portion is adjusted by the density of arrangement of said fins provided on said outer surface of said hydrogen storage alloy containers.

\* \* \* \* \*